Patented Sept. 26, 1950

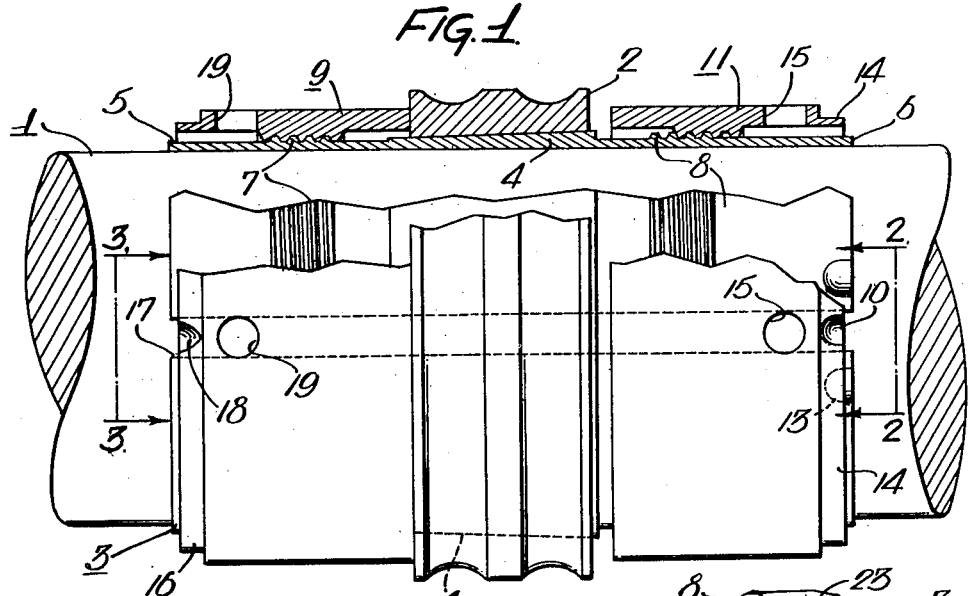
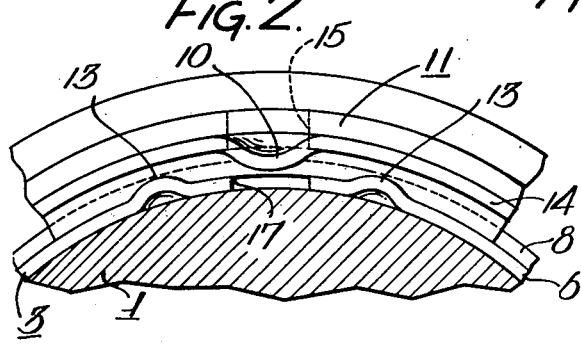
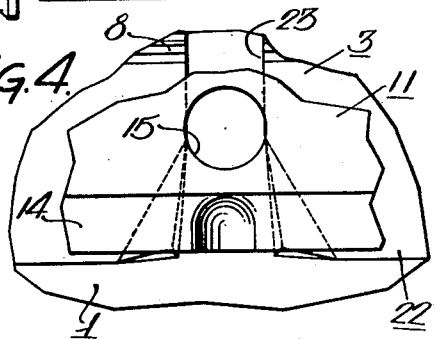
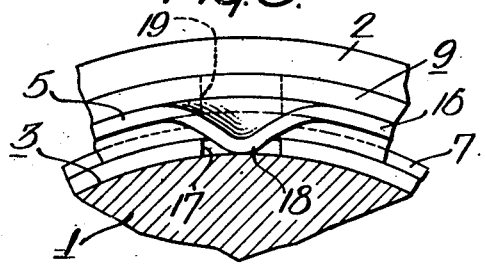
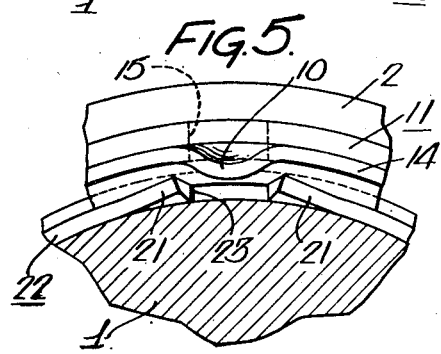

2,523,418

UNITED STATES PATENT OFFICE 2,523,418

BEARING AND SHAFT ASSEMBLY

Joseph Loretto Brusca, Cheltenham, Pa., assignor to SKF Industries, Inc., Philadelphia, Pa., a corporation of Delaware Application December 9, 1948, Serial No. 64,331

9 Claims. (Cl. 287—52.06)

This invention relates to anti-friction bearing and shaft assemblies of the type wherein the inner race of the bearing is secured to the shaft, and a principal object of the invention is to provide an improved device for detachably securing the said race to the shaft.

More specifically, the invention relates to that type of assembly wherein the bearing race is secured to the shaft through the medium of an interposed split sleeve of tapered form which is wedged between the race and the shaft and which is provided with nuts threaded on the outside of the sleeve for engagement with the proximate ends of the race, said nuts constituting means for effecting the relative movements of the sleeve and the race required for wedging the sleeve between the race and the shaft or for subsequently retracting the wedge, and also for preventing relative movements of the sleeve and race which would tend to loosen the connection. The primary object of the invention is to provide an improved means for releasably locking the nuts in adjusted position on the sleeve.

The invention will be more readily understood by reference to the attached drawings, wherein:

Fig. 1 is a side and partial sectional view of an assembly including locking means made in accordance with the invention;

Fig. 2 is a fragmentary enlarged sectional view on the line 2—2 Fig. 1;

Fig. 3 is a fragmentary enlarged sectional view on the line 3—3 Fig. 1, and

Figs. 4 and 5 are fragmentary enlarged plan and elevational views respectively of an assembly illustrating a modification within the scope of the invention.

In the assembly illustrated in the drawings, the reference numeral 1 indicates a shaft; 2 is the inner race ring of an anti-friction bearing, said ring having a tapered bore; and 3 is a longitudinally split sleeve interposed between the shaft and the race and having an intermediate tapered portion 4 providing a seat for the race ring. By forcibly wedging the sleeve between the shaft and the ring the latter may be frictionally securely bound to the shaft in obvious manner.

In the present instance the sleeve 3 extends at each end beyond the tapered portion 4, and each extending part of the sleeve, designated respectively by the reference numerals 5 and 6, are of lesser wall thickness than the said intermediate tapered portion and each is provided with an external thread, 7 and 8 respectively. These threaded portions are adapted to engage the internal threads of a pair of nuts 9 and 11. It will be apparent that when the sleeve has been slipped onto the shaft and the inner race ring 2 is seated on the tapered portion 4 of the sleeve, then the sleeve may be moved axially with respect to the race ring, or vice versa, by turning the nut 9 inwardly against the proximate end face of the ring, such relative movement of the sleeve and ring having the effect of wedging the tapered portion of the sleeve between the race and the shaft, thereby contracting the sleeve upon the shaft and binding the ring to the latter.

If it be desired to release the bearing from the shaft the nut 9 is first backed away from the ring 2 and the nut 11 then advanced into engagement with the proximate end face of the ring, continued adjustment of the nut resulting in a relative movement of the sleeve and ring in a direction withdrawing the tapered intermediate portion 4 of the sleeve from its wedged engagement.

In order to prevent displacement of the nut 11 from or on the sleeve pending need for its use as described above to release the bearing from the shaft, means is provided for releasably locking the nut to the sleeve. In accordance with the present invention this locking means comprises a pair of projections 13 on the sleeve 3, the height of these projections being such as to afford clearance between the tops thereof and the inner surface of the unthreaded portion of the nut. In the present instance the projections are formed at the edge of the sleeve by outward displacement of localized portions of the wall of the latter. In conjunction with these projections the nut 11 is provided at its outer edge with a projecting flange 14 of relatively small radial thickness so that this flange may be readily peened or pressed inwardly to form an inward projection on the nut corresponding but reverse to the projections 13 on the sleeve. The parts are designed so that when the elements are in the operative positions shown in Fig. 1 with the outer terminal edges of the sleeve and nut in the same or closely adjoining planes, the flange 14 will overlie the projections 13 and an indentation of the flange 14 at a point between the projections 13 will then bring the resulting inward projection, designated by the reference numeral 10, into interfering relation with the sleeve projections 13 and will effectively lock the nut against movements causing a displacement of the nut axially in either direction on the sleeve. It is evident, however, that with this device the nut 11 may still be turned on the sleeve by means, for example, of a spanner wrench inserted in an aperture 15, or by other suitable tool, so that the inward projection 10 of the flange 14, aforesaid, will be pressed outwardly by camming action of the projections 13, thereby freeing the nut for axial movement on the sleeve into pressure engagement with the proximate end of the race ring.

It will be noted by reference to Fig. 2, that the tip of the indentation 10 has clearance with the outer surface of the sleeve 6. By suitably proportioning the projections 13 and 10, the latter may be made to pass over the former by resilient flexure, primarily of the relatively thin and unsupported flange 14, without mutilation of either of the interfering projections. Thus the locking means will remain intact over long periods of use. Preferably, the nut will go to the user with the indentation 10 already formed in the flange.

With the aforedescribed construction, it will be apparent that the threads of the nut would interfere with the projections 13 if it were attempted to apply the nut to the sleeve after the latter has been placed on the shaft. Application of the nut to the sleeve is effected therefor prior to placing the sleeve on the shaft and by contraction of the sleeve in obvious manner.

The nut 9 may be locked in the advanced position by peening the flange 16 down into the slot 17 of the sleeve 3, as indicated at 18 in Figs. 1 and 3, thus positively precluding relative axial displacement of the sleeve and nut and of the sleeve and inner race ring 2. The nut may be released when desired by forcibly turning the nut on the sleeve through the medium, for example, of a spanner wrench inserted in an aperture 19 in the nut, the indentation 18 being cammed out by contact with an edge of the said slot. Should the indentation drag on the surface of the sleeve, a turn or two of the nut will carry it free of the closely adjoining end of the sleeve.

The aforedescribed embodiment is susceptible of modification in detail without departure from the principle of the invention. Figs. 4 and 5, for example, show the locking projections on the sleeve, designated in this instance by the reference numeral 21, formed by turning out the corners of the sleeve 22 where the longitudinal edges of the slot 23 intersect the end edge of the sleeve. In this case the nut, its terminal flange, and the locking indentation of the flange are indicated by the same reference numerals used on the corresponding elements in Fig. 2. It is evident also that a single projection on the sleeve would serve to lock the nut to the sleeve but would also permit the nut to turn through substantially one full revolution which is undesirable.

I claim:

1. In a shaft and bearing assembly, a tapered externally threaded split sleeve wedged between and uniting the shaft with the inner race ring of said bearing, a nut threaded on the sleeve for engagement with an end face of said ring, a projection on the outer surface of the sleeve, and means projecting inwardly from the nut into interfering relation with said sleeve projection to lock the nut in position on the sleeve, said inwardly projecting means being adapted for pressure displacement outwardly by camming action of the said sleeve projection when the nut is forcibly turned on the sleeve.

2. In shaft and bearing attachment means of the type including a tapered externally threaded split sleeve adapted for wedged engagement between the shaft and the inner race ring of said bearing, and a nut threaded on the sleeve for engagement with an end face of said ring, the combination with a projection on the outer surface of the sleeve, of means on said nut adapted for displacement inwardly into interfering relation with the sleeve projection to lock the nut in position on the sleeve, said inwardly displaceable means being adapted for subsequent reverse displacement by camming action of the said sleeve projection when the nut is forcibly turned on the sleeve to thereby release the nut.

3. Attachment means according to claim 2 wherein the sleeve projection is located adjacent an end of the sleeve.

4. Attachment means according to claim 2 wherein the sleeve is provided with a second projection substantially in circumferential alignment with the first.

5. Attachment means according to claim 2 wherein the sleeve threads are located on the end of the sleeve which adjoins the larger end of the tapered portion and intermediate the said tapered portion and the said sleeve projection.

6. Attachment means according to claim 2 wherein the sleeve threads are located on the end of the sleeve which adjoins the larger end of the tapered portion and intermediate the said tapered portion and the said sleeve projection, and wherein further the displaceable portion of the nut is at the end thereof more remote from the said tapered portion of the sleeve.

7. Attachment means according to claim 2 wherein the sleeve is tapered in a part remote from both ends and the said threads are formed in the untapered portions adjoining the respective ends for reception of nuts to engage both ends of the inner race ring of the bearing.

8. Attachment means according to claim 2 wherein the sleeve is tapered in a part remote from both ends and the said threads are formed in the untapered portions adjoining the respective ends for reception of nuts to engage both ends of the inner race ring of the bearing, and wherein also inwardly displaceable means is provided at the outer end of each of the nuts and circumferentially spaced projections are provided at least at the end of the sleeve proximate to the larger end of the tapered part.

9. Attachment means according to claim 2 wherein the sleeve projection is formed by turning out a corner of the sleeve where a longitudinal edge of the slot intersects an end edge of the sleeve.

JOSEPH LORETTO BRUSCA.

REFERENCES CITED

The following references are of record in the file of this patent:

UNITED STATES PATENTS

| Number | Name | Date |
|---|---|---|
| 296,703 | Mitchell | Apr. 8, 1884 |
| 2,377,035 | Pixley | May 29, 1945 |